(12) United States Patent
Chen (10) Patent No.: US 9,210,596 B1
(45) Date of Patent: Dec. 8, 2015

(54) SELECTIVE BEARER RE-INITIATION UPON COMMUNICATION FAILURE

(71) Applicant: Sprint Spectrum L.P., Overland Park, KS (US)

(72) Inventor: Bonnie Chen, Grapevine, TX (US)

(73) Assignee: Sprint Spectrum L.P., Overland Park, KS (US)

( * ) Notice: Subject to any disclaimer, the term of this patent is extended or adjusted under 35 U.S.C. 154(b) by 308 days.

(21) Appl. No.: 13/780,958

(22) Filed: Feb. 28, 2013

(51) Int. Cl.
*H04L 12/26* (2006.01)
*H04W 24/04* (2009.01)

(52) U.S. Cl.
CPC ...................................... *H04W 24/04* (2013.01)

(58) Field of Classification Search
None
See application file for complete search history.

(56) References Cited

U.S. PATENT DOCUMENTS

2013/0250750 A1* 9/2013 Nishida et al. ................ 370/216

FOREIGN PATENT DOCUMENTS

WO WO2012073937 * 6/2012

OTHER PUBLICATIONS

"3rd Generation Partnership Project; Technical Specification Group Services and System Aspects; General Packet Radio Service (GPRS) enhancements for Evolved Universal Terrestrial Radio Access Network (E-UTRAN access (Release 9)," 3GPP TS 23.401 V9.10.0, (Sep. 2011).
"IMS PDN connection deactivation while the UE in the idle state," SA WG2 Meeting #93, S2-123525, Oct. 11, 2012.
"IMS PDN connection while the UE is in the idle state," 3GPP TSG-SA2 Meeting #93, SA2-123526, version: 9.13.0, Oct. 11, 2012.
"IMS PDN connection while the UE is in the idle state," 3GPP TSG-SA2 Meeting #93, SA2-123527, version: 10.8.0, Oct. 11, 2012.
"IMS PDN connection while the UE is in the idle state," 3GPP TSG-SA2 Meeting #93, SA2-123528, version: 11.3.0, Oct. 11, 2012.
"Notifying UE on specific PDN disconnection while the UE is in the idle state," SA WG2 Meeting #93, S2-124089, version 11.3.0, Oct. 12, 2012.
"Notifying UE on specific PDN disconnection while the UE is in the idle state," SA WG2 Meeting #93, S2-124134, version: 10.8.0, Oct. 12, 2012.
"3rd Generation Partnership Project; Technical Specification Group Core Network and Terminals; Restoration procedures (Release 10)," 3GPP TS 23.007 V10.7.0 (Mar. 2012).

* cited by examiner

*Primary Examiner* — Minh-Trang Nguyen (57) ABSTRACT

A method and system for selectively re-initiating bearer connections upon communication failure. In a scenario where a gateway provides connectivity with an application server for numerous user equipment devices (UEs), when gateway communication with the application server fails, a determination may be made as to which UEs recently missed communication from the application server, and those determined UEs may be paged to re-initiate their bearer connections and to re-establish gateway registration with an appropriate application server.

20 Claims, 4 Drawing Sheets

SELECTIVE BEARER RE-INITIATION UPON COMMUNICATION FAILURE

BACKGROUND

Unless otherwise indicated herein, the materials described in this section are not prior art to the claims and are not admitted to be prior art by inclusion in this section.

A cellular wireless network may include a number of base stations that radiate to define wireless coverage areas, such as cells and cell sectors, in which user equipment devices (UEs) such as cell phones, tablet computers, tracking devices, embedded wireless modules, and other wirelessly equipped communication devices, can operate. In turn, each base station may be coupled with network infrastructure that provides connectivity with one or more transport networks, such as the public switched telephone network (PSTN) and/or a packet-switched network such as the Internet for instance. With this arrangement, a UE within coverage of the network may engage in air interface communication with a base station and may thereby communicate via the base station with various remote network entities or with other UEs.

In an example arrangement, the network infrastructure may include one or more gateways or similar components that provide connectivity with a packet-switched network so as to support various communication services. For instance, the infrastructure may include gateways that support general packet-data communications, such as general web browsing, file transfer, and the like. Further, the infrastructure may include gateways that support real-time packet-based communications such as voice over Internet Protocol (VoIP) and streaming media for instance, by exchanging communications with one or more application servers that provide such services. And still further, the infrastructure may include gateways that support other types of communication services as well, possibly arranged to exchange communications with other types of application servers and systems.

When a UE powers on or moves into the coverage of a base station, the UE engages in a process of registering or "attaching" with the network, which triggers setup of various communication channels for the UE. For example, in a network operating according to the Long Term Evolution (LTE) protocol, a UE transmits an attach request message to the base station, which the base station forwards to a controller such as a mobility management entity (MME). In response, the controller then invokes a process to authenticate and authorize the UE and retrieves a service profile of the UE from a subscription database and stores them for later reference during service invocation to determine one or more services that the UE is authorized to use. Further, the controller engages in signaling with the base station and one or more gateways to define one or more bearer connections for the UE between the base station and the gateways. The base station may then assign a radio link layer connection for the UE. And to the extent the gateways support communication with particular servers or systems, the gateways may then further register with those servers or systems on behalf of the UE.

Once these connections are established, the UE may then communicate bearer data (e.g., application layer communications such as web browsing and VoIP setup signaling and traffic) with various application servers or systems. In particular, as the base station serves the UE, bearer data may pass from the UE over the radio link layer connection to the base station, through one or more bearer connections between the base station and one or more gateways, and from the one or more gateways onto the packet-switched network and perhaps to particular application servers or systems. Likewise, communications destined to the UE from various application servers or system may pass to the one or more gateways registered on behalf of the UE, then over one or more bearer connections from the one or more gateways to the serving base station, and over the radio link layer connection from the base station to the UE.

OVERVIEW

For operational reasons, communication that normally occurs between a gateway and various application servers or systems may fail. By way of example, if a gateway is arranged to communicate over a packet-switched network with a particular application server, the gateway may malfunction or fail, various routers or other network nodes or links between the gateway and the application server may malfunction or fail, and/or the application server may malfunction or fail. When problems like this occur, the gateway may no longer be able to communicate with the application server or system. Consequently, any and all UEs that have bearer connections with that gateway for communication with a particular application server or system may be unable to communicate with the application server or system and may be unable to use the service provided by the application server or system.

As a specific example of this, consider a VoIP service provided by an Internet Multimedia Subsystem (IMS) having a call server that functions to engage in Session Initiation Protocol (SIP) communication to set up and manage VoIP sessions for UEs. In practice, a gateway may be arranged to communicate with the IMS and particularly with the call server. If a UE subscribes to such VoIP service, then when the UE attaches, the MME would set up a dedicated VoIP bearer connection for the UE between the gateway and the serving base station, and the MME would forward an IMS call server registration (e.g., SIP REGISTER) to the gateway to cause the gateway to register on behalf of the UE with the IMS call server.

In normal practice with such an arrangement, when the call server has an incoming call to connect to the UE, the call server would route the call by transmitting a SIP INVITE message to the registered gateway, and the gateway would pass that INVITE message over the dedicated bearer to the base station for transmission in turn to the UE. The UE may then respond with a SIP 200 OK message that would pass back to the gateway and in turn to the call server. And the call server may then transmit a SIP ACK message to complete set up of the call or at least a call leg with the UE.

In that scenario, if communication between the gateway and call server fails, it is possible that such a SIP INVITE will never reach the UE, and, in view of the lack of response, the IMS call server may abandon setup of the call and, if configured by an operator or subscriber, ultimately transfer the call to a voice mail system for the UE. Yet the UE may have in fact been available, but simply not reachable due to the failed communication between the gateway and call server.

If such a failure of communication between the gateway and application server occurs for a particular service, and if the MME detects the failure (e.g., the gateway notifies the MME of the failure), the MME may responsively signal to each UE that has a bearer connection associated with that service, to cause each such UE to detach and re-attach, so as to trigger re-establishment of communication between a gateway and application server for the UE. In particular, the MME may page each such UE with a detach/re-attach directive that identifies the bearer connection at issue, and each UE may respond to such a request by transmitting a re-attach request for the identified bearer connection. Upon receipt of that re-attach request, the MME may then signal to an appropriate gateway to refresh the bearer connection and re-establish working communication with an appropriate application server or system.

In practice, the network may further include a Domain Name System (DNS) server that includes data correlating various application services (e.g., application service IDs) with particular gateways (e.g., gateway addresses) and/or particular application servers (e.g., server addresses). If a UE profile specifies that a UE subscribes to a particular service, such as VoIP service for instance, the DNS correlation data may thus specify a gateway and/or application server to use for that service. Further, the DNS correlation data may additionally specify a second choice gateway and/or application server in the event a preferred gateway and/or application server is unavailable.

When a UE requests re-attachment of its bearer connection, the MME performs a gateway discovery procedure that may use this DNS correlation data to select a gateway for the UE, and the MME may then signal to that gateway. If the gateway does not respond or responds with an error, then MME may then use the DNS correlation data to select a next listed gateway instead. Likewise, once the MME successfully signals to a gateway, the gateway may use the DNS correlation data to select an application server with which to register, or the gateway may select an application server based on an application server ID provided by the UE, and the gateway may forward a registration message to that application server. If that application server does not respond or responds with an error, the gateway may then use the DNS correlation data to select a next listed application server instead. This process may continue until a gateway has registered with and thus established communication with an appropriate application server for the UE.

Unfortunately, a problem with having an MME or other controller page every UE that has a bearer connection with the gateway at issue and triggering re-attachment of each such UE is that the signaling may overload the network. This is especially the case for a service such as VoIP, as many UEs may have bearer connections with the same gateway that communicates with the same IMS call server. Paging all such UEs at once may overload the air interface control channels in various coverage areas, may overload control channels for communication between base stations and the MME, and may overload processing capacity at the base stations, the MME, and/or associated infrastructure.

Disclosed herein is an improved method and system to help address a situation like this more efficiently. In accordance with the disclosure, when a failure of communication occurs between a gateway and an application server, a determination may be made as to which UEs have recently experienced a missed communication from the application server, and those particular UEs may be paged to trigger re-initiation of their bearers and associated gateway communications before other UEs are paged. The UEs that have recently experienced missed communications from the application server may be most likely to again receive communications from the application server, and so it may be most useful to re-initiate their connections and gateway communications before doing so for other UEs, so as to help avoid overloading the signaling infrastructure.

In one respect, disclosed herein is thus a method operable in a communication system, in which a gateway system is configured to provide bearer data connectivity between UEs and an application server system, and, for a given one of the UEs, a bearer connection carries bearer data between the UE and the gateway system and the gateway system communicates the bearer data with the application server system. The method involves detecting failure of communication between the gateway system and the application server system and, responsive to detecting that failure, (i) determining which one or more of the UEs have each recently missed communication from the application server system, wherein the determined one or more UEs includes the given UE, (ii) responsive to determining that the given UE recently missed communication from the application server system, directing the given UE to request re-initiation of the bearer connection (e.g., detachment and re-attachment), wherein re-initiation of the bearer connection results in re-establishment of communication between the gateway system and the application server system on behalf of the given UE.

In another respect, disclosed herein is a method that involves, for each of a plurality of UEs, setting up a respective bearer connection for carrying bearer data between the UE and a gateway system, the gateway system registering with the application server system on behalf of each UE and providing connectivity between each UE's bearer connection and the application server system. The method may then involve detecting failure of communication between the gateway system and the application server system and, responsive to detecting that failure, (i) determining which of the UEs have each recently experienced threshold missed communication from the application server system, and (ii) directing each of the determined UEs to re-initiate setup of the UE's respective bearer connection. More particularly, directing the UE to re-initiate setup of the UE's respective bearer connection may occur before directing one or more other affected UEs to do so as well.

Still further, disclosed herein is an MME that includes a network communication interface, a processing unit, data storage, and program instructions stored in the data storage and executable by the processing unit to carry out various functions. The functions may include engaging in signaling through the network communication interface to set up for a UE at least one bearer connection with a gateway system and to cause the gateway system to register with a call server system on behalf of the UE, the gateway system providing connectivity for the UE between the bearer connection and the call server system. Further, the functions may include making a first determination that connectivity between the gateway system and the call server system has failed, and, responsive to making the first determination, making a second determination of whether the UE has recently missed communication from the call server. Still further, the method may then include, responsive to the second determination being that the UE has recently missed communication from the call server, engaging in further signaling through the network communication interface to direct the UE to re-initiate the bearer connection. Re-initiation of the bearer connection may then result in re-registration of the gateway system with the call server system on behalf of the UE.

These as well as other aspects, advantages, and alternatives will become apparent to those of ordinary skill in the art by reading the following detailed description, with reference where appropriate to the accompanying drawings. Further, it should be understood that the descriptions provided in this summary and below are intended to illustrate the invention by way of example only and not by way of limitation.

DETAILED DESCRIPTION

As noted above, FIG. 1 is a simplified block diagram of an example network arrangement in which aspects of the present disclosure can be implemented. It should be understood, however, that this and other arrangements and processes described herein are set forth for purposes of example only, and that other arrangements and elements (e.g., machines, interfaces, functions, orders of elements, etc.) can be added or used instead and some elements may be omitted altogether. Further, those skilled in the art will appreciate that many of the elements described herein are functional entities that may be implemented as discrete components or in conjunction with other components, in any suitable combination and location, and that various disclosed functions can be implemented by any combination of hardware, firmware, and/or software, such as by one or more processors programmed to execute computer instructions for instance.

Figure 1:
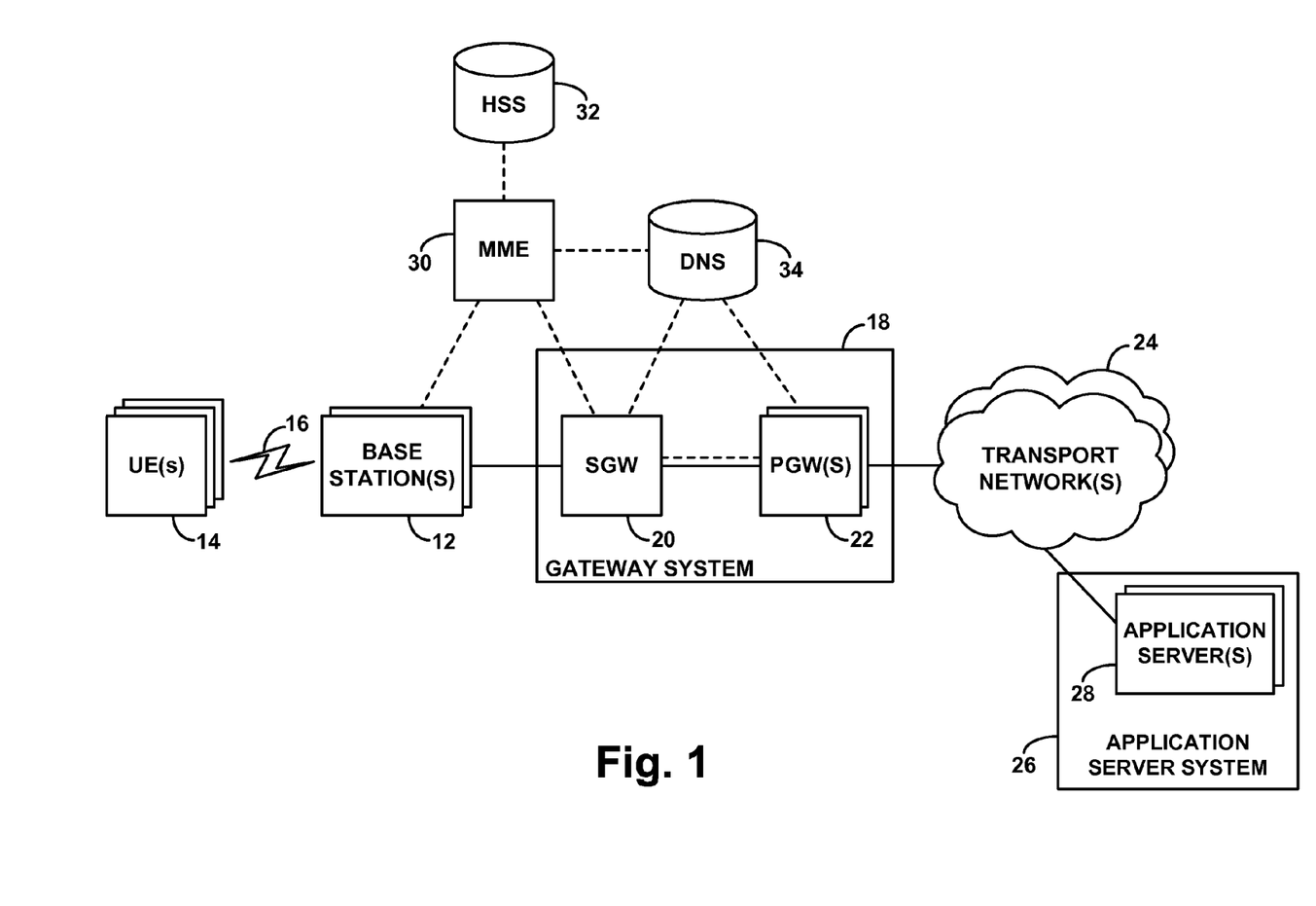
FIG. 1 is a simplified block diagram of a network arrangement in which aspects of the present disclosure can be implemented.

The arrangement of FIG. 1 includes by way of example one or more base stations (e.g., eNodeBs) 12 and multiple UEs 14 within coverage of the base station(s) 12. The base station(s) and UEs may be configured to communicate with each other over a radio frequency air interface 16 according to any of a variety of air interface protocols, examples of which include Orthogonal Frequency Division Multiple Access (OFDMA) (e.g., Long Term Evolution (LTE) or Wireless Interoperability for Microwave Access (WiMAX)), Code Division Multiple Access (CDMA), Global System for Mobile Communications (GSM), and others now known or later developed.

As further illustrated, the arrangement includes a gateway system 18 comprising a representative serving gateway (SGW) 20 and one or more packet gateways (PGWs) 22. The SGW 20 is configured to communicate with the base stations 12 and with the various PGWs 22. And the PGWs 22 are then arranged to provide connectivity with one or more transport networks 24 such as the public Internet and various private application service networks for instance. Shown sitting on the transport network(s) is then an application server system 26 comprising one or more application servers 28, which may support various application services for the UEs. By way of example, a representative application server 28 may be an IMS server configured to provide VoIP services.

In addition, the arrangement includes a representative MME 30, which functions as a controller and may be configured to carry out various functions described herein. The MME is configured to communicate with the base station(s) 12 and with the SGW 20. Further, the MME is configured to communicate with a Home Subscriber Server (HSS) 32, which may store account and service profiles for various UEs, and with a DNS server 28, which may store correlation data as described above. As shown, the SGW 20 and PGWs 22 may also be configured to communicate with the DNS server 28.

In practice, many of these components may be owned and/or operated by or for a telecommunications service provider such as a cellular wireless carrier and may physically sit as nodes on a core packet network operated by the service provider. Communications over the various illustrated interfaces may thus pass between various network entities as packet-based communications, such as IP communications for instance, through the core network. As such, dashed lines may represent logical signaling links for carrying signaling messages such as attach requests and responses and bearer setup messages, and solid lines may represent logical bearer links for carrying bearer data such as web browsing data and VoIP signaling and traffic for instance.

With the example arrangement shown, as each UE 14 enters into coverage of a base station 12, the UE may transmit an attach request over the air interface 16 to the base station, and the base station may forward the attach request to MME 30. The MME may then authenticate and authorize the UE and obtain from HSS 32 an indication of one or more application services to which the UE subscribes and may store an indication of those services in a context record for the UE, keyed to a UE identifier such as an International Mobile Subscriber Identity (IMSI) for instance. In turn, the MME may then engage in a process to set up one or more bearer connections for the UE, such as one bearer connection for each service to which the UE subscribes. By way of example, if the UE subscribes to engage in general Internet communications and VoIP service, the MME may work to set up a default bearer (e.g., non-guaranteed-bit-rate bearer) for use to carry general Internet traffic for the UE, and the MME may further work to set up a dedicated bearer (e.g., guaranteed-bit-rate bearer) for use to carry VoIP signaling (e.g., SIP signaling) and traffic for the UE.

To set up each such bearer for a UE, the MME may create a bearer identity (e.g., evolved packet system (EPS) bearer identity) and may query the DNS server 34 to determine which PGW should serve the service at issue (e.g., default Internet service or VoIP service). The MME may then send to the SGW 20 a create-session request message specifying the bearer identity and the selected PGW. In response, the SGW may then create an entry for the UE in a bearer table that the SGW maintains, designating the bearer identity and an address or other identifier of the serving base station, and may further send to the specified PGW a create-session request. The PGW may then assign an IP address for the UE and create an entry in a bearer table that the PGW maintains. The PGW may then send a create-session response to SGW, and the SGW may send a create-session response to the MME. And the MME may responsively send to the base station an initial context setup request with an attach-accept message, providing the bearer identity (and perhaps an address or identity of the SGW), in response to which the base station may then allocate a radio bearer for UE communication of bearer data over the air interface 16.

Through this process, each such bearer connection is thus defined as a connection extending between the base station 12 and the gateway system 18 and particularly extending between the base station 12 and the SGW 20 and between the SGW 20 and the selected PGW 22. In particular, the base station, SGW, and PGW may each store context data specifying the assigned bearer identity and applicable addresses or identities of other entities with which to communicate data for that bearer.

Further, in association with a bearer connection for a UE, in addition to assigning an IP address for the UE, the selected PGW may also register on behalf of the UE with an application server 28 if appropriate. For instance, if bearer at issue is a dedicated bearer for use to support VoIP communications, the PGW may register with an IMS call server on behalf of the UE, such as by sending a SIP REGISTER to the IMS call server, to establish that the PGW is functioning as a gateway for the UE. This way, when the IMS call server has a SIP INVITE to send to the UE, the IMS server may send the INVITE to the PGW for transmission in turn to the UE.

Thus, once this process is complete, the UE may engage in communication with an IMS call server via the air interface, the bearer connection, the gateway system, and a transport network. For instance, the UE may send SIP messages and bearer traffic over the radio bearer to the base station, the base station may send that data over the dedicated bearer to the SGW, the SGW may send the data to the PGW, and the PGW may send the data over the transport network to the call server. Likewise, the call server may send SIP messages and bearer traffic via the transport network to the PGW, the PGW may send that data to the SGW, the SGW may send that data over the dedicated bearer to the base station, and the base station may send that data over the radio bearer to the UE.

In an arrangement such as this, the issue addressed by the present disclosure may arise when communication between the gateway system 18 and the application server system 26 fails. More particularly, in a scenario where a particular PGW 22 is registered on behalf of numerous UEs 14 with a particular application server 28 and communication between that PGW and that application server fails, it may become impossible to communicate bearer data between the served UEs and that application server. As discussed above, one way to help address that issue is to have the MME simply page each of the UEs to cause the UEs to re-attach, so as to trigger re-establishment of gateway communication with an appropriate application server. However, paging all such UEs at once may overwhelm the system.

In accordance with the present disclosure, as noted above, when such a communication failure occurs, a determination may be made as to which UEs have recently missed communications from the application server, and the MME may then page those UEs before paging other UEs.

Figure 2:
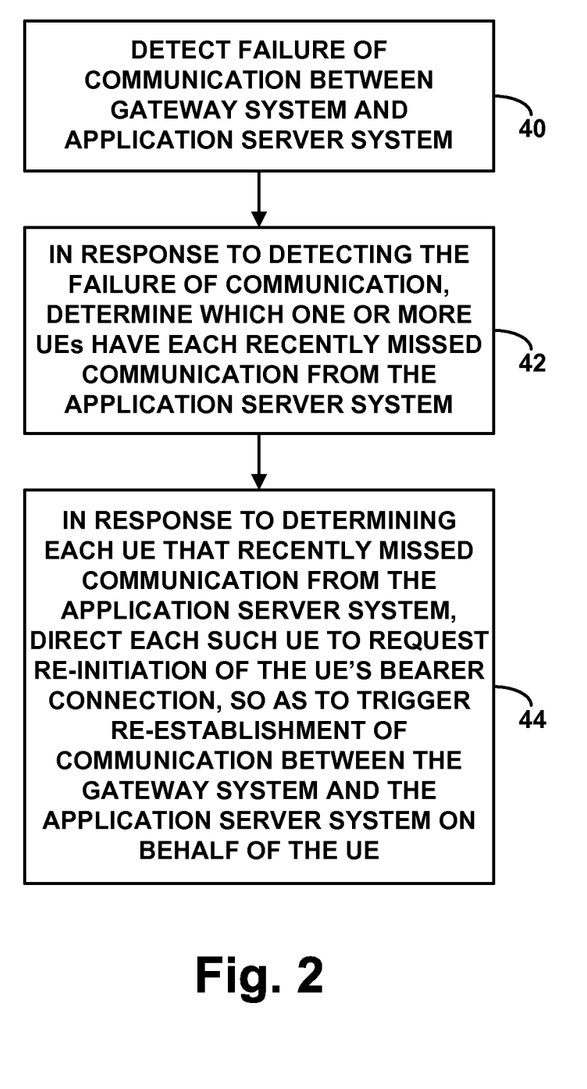
FIG. 2 is a flow chart depicting functions that can be carried out in accordance with an example method.

FIG. 2 is a flow chart depicting functions that may be carried out in this method. This process may apply in a communication system that includes a gateway system configured to provide bearer data connectivity between user UEs and an application server system, and where, for wherein for a given one of the UEs, a bearer connection is in established to carry bearer data between the UE and the gateway system and the gateway system is arranged to communicate the bearer data with the application server system. In the arrangement of FIG. 1, for instance, the DNS server 34 may specify a particular PGW 22 for use to handle VoIP communications, and numerous UEs 14 may thus have dedicated bearers with that PGW, and that PGW may be registered with a particular IMS call server (of an IMS call server system) on behalf of each such UE.

As shown in FIG. 2, at block 40, the method involves detecting failure of communication between the gateway system and the application server system. Continuing with the example scenario, for instance, this may involve that communication between particular PGW and the IMS server has failed.

In practice, MME 30 or another entity could be arranged to detect this failure in various ways. As one example, for instance, the PGW and the IMS server may be arranged to exchange periodic heartbeat (keepalive) signals with each other, and upon failure of communication between the PGW and IMS server, the PGW server may stop receiving heartbeat messages or acknowledgements (responses) from the IMS server, such as by detecting an absence of a threshold number of heartbeat messages or acknowledgements. The PGW may then responsively transmit a signaling message to the MME (possibly via the SGW), indicating to the MME that communication between the PGW and the IMS server has failed, perhaps simply informing the MME that the PGW's connection for the particular application service is down.

As another example, in a scenario where the PGW receives an abundance of communications from the IMS server, such as many SIP INVITE messages destined to various UEs, if the PGW detects the absence of such communications for a predefined threshold non-zero period of time (such as five minutes or fifteen minutes for instance), the PGW may programmatically conclude that a communication failure has occurred and may similarly notify the MME.

Receipt of such notifications from the PGW indicating that communication between the PGW and the IMS server has failed may constitute the MME detecting that the communication between the PGW and the IMS server has failed.

As still another example, the MME and the PGW (via the SGW) may be arranged to exchange periodic heartbeat signals with each other, and if the PGW fails, the MME may detect the failure by detecting a threshold absence of heartbeat messages or acknowledgements from the PGW. Yet other examples may be possible as well.

Continuing with reference to FIG. 2, at block 42, the method may then involve responding to the detecting of the communication failure between the gateway system and the application server system by determining which one or more of the UEs have each recently missed communication from the application server system, so as to facilitate directing the determined one or more UEs in particular to re-initiate their bearer connections and associated gateway registrations before directing one or more other UEs to re-initiate their bearer connections and associated gateway registrations.

The issue at this stage may be which UEs missed one or more communications from the application server system within the past threshold period of time, such as the past five minutes for instance. Further, the issue may be which UEs missed a threshold number of communications from the application server system. Alternatively, the issue may simply be which UEs have missed one or more communications from the application server system, with the assumption being that if a record exists of a missed communication, the occurrence of the missed communication was recent enough.

Further, note that the issue here is not merely determining which UEs had bearer connections with the gateway at issue, as that would be no different than merely determining which UEs are served by the gateway. Rather, the issue more specifically which of the UEs has missed communication from the application server system.

To facilitate making this determination in the example scenario where the application service at issue is VoIP service, the MME may query the HSS 32 to determine which one or more attached UEs have a voice mail indicator in their service profiles, which may (correctly or incorrectly) indicate that the one or more UEs each missed a call from the IMS server. For instance, where the PGW is arranged to communicate with an IMS server to support VoIP service and communication between that PGW and IMS server has failed, the MME may refer to the context records that the MME has established for various attached UEs, to determine the identities of attached UEs that subscribe to the VoIP service. The MME may then query the HSS 32 based on the identity of each such UE, to determine whether the HSS has a stored voice mail indicator stored for the UE. The MME may thus determine that each such UE for which the HSS has a stored voice mail indicator missed a communication from the IMS server, whereas one or more others may not have missed a communication from the IMS server.

As another example, the MME may make this determination by determining the identities of UEs to which the IMS server recently sent particular communications, such as SIP INVITE messages, and to determine which of those messages did not trigger MME paging of the UEs. In practice, if the IMS server sends a SIP INVITE for transmission to a UE and the UE does not have an active radio connection, then when the SGW receives that SIP INVITE, the SGW would signal to the MME and the MME would page the UE to cause the UE to acquire a radio connection. To the extent the IMS server recently sent a SIP INVITE to a UE and the MME did not recently page that particular UE, a reasonable conclusion may thus be that communication between the IMS server and the PGW failed.

To evaluate this in practice, the MME may query the HSS 32 based on the application service at issue, namely VoIP service, and the HSS may responsively query an entity in the IMS network that would have a log of such messages. For instance, the HSS may query a serving call session control function (S-CSCF) through which SIP messages regularly pass, to determine which UEs had SIP INVITE messages from the IMS server within a threshold recent time period, such as the past five minutes for instance. The HSS may then pass a list of such UEs back to the MME. And for each such UE, the MME may refer to a log maintained by the MME to determine whether the MME paged the UE within the same past time period. The MME may then conclude that each UE to which the IMS server recently sent a SIP INVITE but that the MME did not page missed a communication from IMS server.

Alternatively or additionally, the act of determining which UEs recently missed communication from a call server, or to determine whether a particular UE missed communication from the call server, may involve querying the call server itself to obtain data representing one or more missed communications. For instance, this may involve requesting and obtaining from the call server a list of missed communications (e.g., SIP INVITEs to which the call server did not receive a response) from within the past one, five, or ten minutes or within some other period of time.

Continuing still further with reference to FIG. 2, at block 44, in response to determining each UE that recently missed communication from the application server system, the method may then involve directing each such UE to request re-initiation of the bearer connection, so as to trigger re-establishment of communication between the gateway system and the application server system on behalf of the UE.

In the example scenario, this may involve the MME sending to the determined UE, in a page message for instance, a detach request that carries a directive to re-attach and that specifies the UE's bearer identity (and is thus keyed to that bearer identity). In response to that directive, the UE may then send to the base station a re-attach message specifying the bearer identity, and the base station may forward that request to the MME. At this point, the MME may then select a different PGW than it had selected for the UE earlier, by reference to the DNS server 34 as discussed above, and, responsive to the UE's re-attach request, the MME may signal to the SGW, which may signal to the newly selected PGW to trigger registration with a IMS server on behalf of the UE in the manner described above. Alternatively, the MME may select the same PGW that it had selected before, and the PGW may select a different IMS server with which to register on behalf of the UE.

As a result, the gateway system 18 may thus establish a new and different registration with the application server on behalf each UE that was deemed to have recently missed a communication from the application server system. More specifically, if, through the initial registration process, a particular network address of the gateway system (e.g., the network address of a particular PGW) is registered with a particular network address of the application server system, the act of re-registering the gateway system with the application server system on behalf of each such UE may involve (i) registering a different network address of the gateway system with the same address of the call server system and/or (ii) registering the same network address of the gateway system with a different network address of the call server system.

Once the MME has triggered re-initiation the bearer and associated gateway registration for each UE that the MME determined recently missed a communication from the IMS server, the MME may then proceed to do so as well for each other UE having a bearer connection for which communication between PGW and IMS server failed. By thus first re-initiating the connections for the one or more UEs that were deemed to have recently missed communication from the IMS server, before re-initiating connections for one or more other UEs served by the PGW, the MME may help to avoid a signaling overload Furthermore, this method can be enhanced further by updating the DNS correlation data to effectively remove the service correlation with the gateway or application server at issue. In particular, once the MME, SGW, PGW, or other entity learns of the failure of communication between the PGW and the application server for a particular application service, the entity may revise the correlation data at the DNS server. If the correlation data initially correlates the application service with a particular PGW and/or a particular application server, for instance, the entity may revise the correlation data to instead correlate the application service with a different PGW and/or a different application server.

If and when the MME and/or PGW then uses the correlation data as a basis to re-establish communication between the gateway system and the application server system on behalf of the UE, the revised correlation data may help to expedite the process. For instance, for the application service at issue, rather than selecting the same PGW to register and that PGW registering with the same IMS call server, the revised correlation data may provide for selecting a different PGW to register with the same IMS call server and/or selecting the same PGW but having the PGW register with a different IMS call server.

Figure 3:
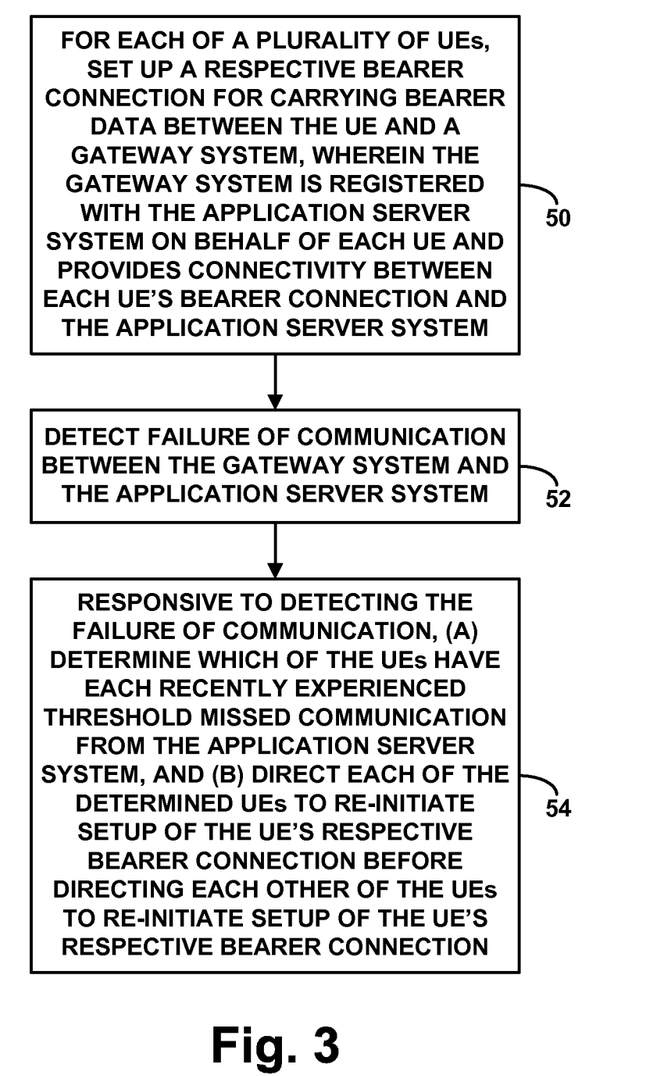
FIG. 3 is another flow chart depicting functions that can be carried out in accordance with an example method.

FIG. 3 is next another flow chart depicting functions that can be carried out in accordance with the present method. As shown in FIG. 3, at block 50, the method may involve, for each of a plurality of UEs, setting up a respective bearer connection for carrying bearer data between the UE and a gateway system, wherein the gateway system is registered with the application server system on behalf of each UE and provides connectivity between each UE's bearer connection and the application server system. At block 52, the method may then involve detecting failure of communication between the gateway system and the application server system. And at block 54, the method may involve, responsive to the detecting, (i) determining which of the UEs have each recently experienced threshold missed communication from the application server system, and (ii) directing each of the determined UEs to re-initiate setup of the UE's respective bearer connection before directing each other of the UEs to re-initiate setup of the UE's respective bearer connection.

Figure 4:
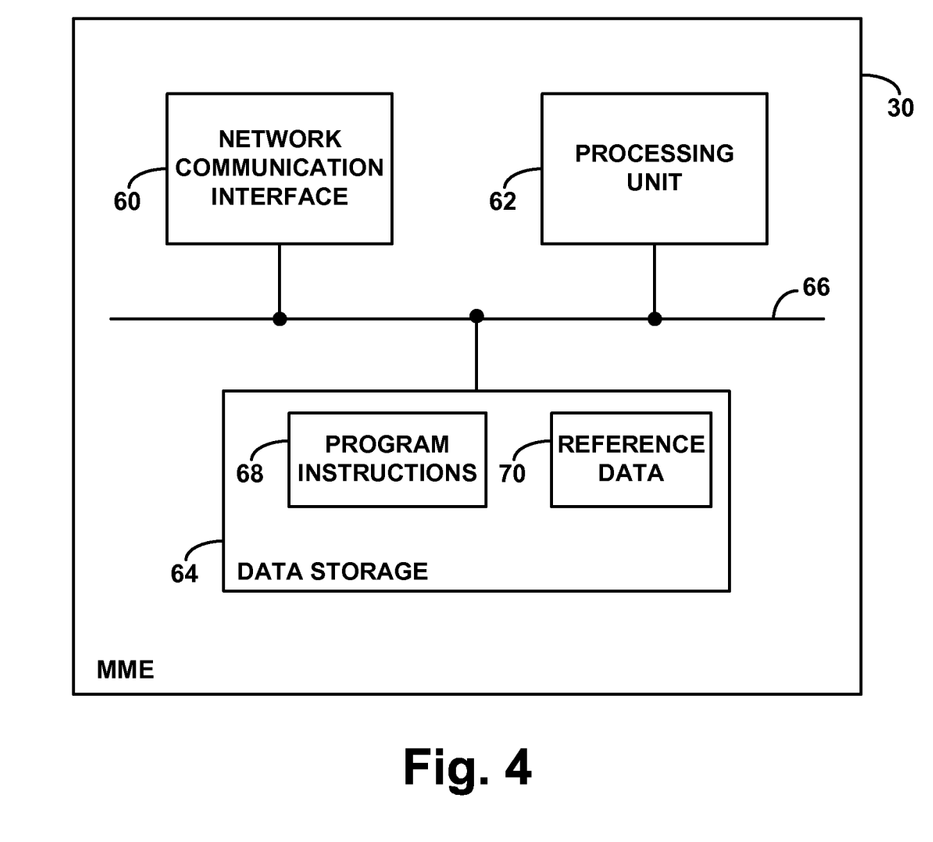
FIG. 4 is a simplified block diagram of a mobility management entity arranged to carry out various described functions.

Finally, FIG. 4 is a simplified block diagram of an example MME, showing some of the functional components that may be included in such an entity to facilitate implementing of the present method. As shown, the example MME includes a network communication interface 60, a processing unit 62, and non-transitory data storage 64, all of which may be communicatively linked together by a system bus, network, or other connection mechanism 66.

Network communication interface 60 functions to facilitate communication with various other network entities shown, such as base station(s) 12, SGW 20, and HSS 32, and DNS server 34. As such, the interface 60 may include one or more network interface modules, such as Ethernet network interface modules for instance or may take any of a variety of other forms, supporting wireless and/or wired communication with these and other components.

Processing unit 62 may then comprise one or more general purpose processors (such as microprocessors) and/or one or more special purpose processors (e.g., application specific integrated circuits). And data storage 64 may comprise one or more volatile and/or non-volatile storage components, such as optical, magnetic, or flash storage, and may be integrated in whole or in part with processing unit 62.

As shown, data storage 64 may hold program instructions 68 and reference data 70. Program instructions 68 are executable or interpretable by processing unit 62 to carry out various functions described herein. By way of example, these functions may include engaging in signaling through the network communication interface to set up for a UE at least one bearer connection with a gateway system and to cause the gateway system to register with a call server system on behalf of the UE, the gateway system providing connectivity for the UE between the bearer connection and the call server system. Further, the functions may include making a first determination that connectivity between the gateway system and the call server system has failed and, responsive to making the first determination, making a second determination of whether the UE has recently missed communication from the call server. And still further, the functions may include, responsive to the second determination being that the UE has recently missed communication from the call server, engaging in further signaling through the network communication interface to direct the UE to re-initiate the bearer connection, wherein re-initiation of the bearer connection results in re-registration of the gateway system with the call server system on behalf of the UE.

Exemplary embodiments have been described above. Those skilled in the art will understand, however, that changes and modifications may be made to these embodiments without departing from the true scope and spirit of the invention.

What is claimed is:

1. A method operable in a communication system, wherein the communication system includes a gateway system configured to provide bearer data connectivity between user equipment devices (UEs) and an application server system, wherein for a given one of the UEs, a bearer connection is established to carry bearer data between the UE and the gateway system and the gateway system is arranged to communicate the bearer data with the application server system, the method comprising:
    detecting failure of communication between the gateway system and the application server system; and
    responsive to the detecting, (i) determining which one or more of the UEs have each recently missed communication from the application server system, wherein the determined one or more UEs includes the given UE, (ii) responsive to determining that the given UE recently missed communication from the application server system, directing the given UE to request re-initiation of the bearer connection, wherein re-initiation of the bearer connection results in re-establishment of communication between the gateway system and the application server system on behalf of the given UE.

2. The method of claim 1, wherein the application server system comprises a call server system.

3. The method of claim 2, wherein the bearer connection comprises a connection that extends between the gateway system and a base station serving the given UE.

4. The method of claim 2, wherein the bearer connection comprises (i) a first connection that extends between a serving gateway and a base station serving the given UE and (ii) a second connection that extends between the serving gateway and the gateway system.

5. The method of claim 2, wherein the bearer connection has a bearer identification, and wherein directing the given UE to request re-initiation of the bearer connection comprises transmitting to the given UE a directive to detach and to re-attach, the directive being keyed to the bearer identification.

6. The method of claim 2, further comprising:
    receiving from the given UE, in response to the directive, an attach request keyed to the bearer identification; and
    responsive to the received attach request, signaling to the gateway system to cause the gateway system to re-establish communication between the gateway system and the call server system on behalf of the given UE.

7. The method of claim 6, wherein the gateway system is registered with the call server system on behalf of the given UE so that the call server system is set to send session initiation messages for the given UE to the gateway system for transmission in turn to the given UE, and wherein re-establishing communication between the gateway system and the call server system on behalf of the given UE comprises re-registering the gateway system with the call server system on behalf of the given UE.

8. The method of claim 7,
    wherein the gateway system includes a plurality of gateways,
    wherein a first gateway of the gateway system is initially registered with the call server system on behalf of the given UE, and
    wherein re-registering the gateway system with the call server system on behalf of the given UE comprises registering a second gateway of the gateway system, instead of the first gateway of the gateway system, with the call server system on behalf the given UE.

9. The method of claim 7,
    wherein the call server system includes a plurality of call servers,
    wherein the gateway system is registered with a first call server of the call server system on behalf of the given UE, and
    wherein re-registering the gateway system with the call server system on behalf of the given UE comprises registering the gateway system with a second call server of the call server system, instead of the first call server of the call server system, on behalf of the given UE.

10. The method of claim 7, wherein a first network address of the gateway system is registered with a first network address of the call server system, and wherein re-registering the gateway system with the call server system on behalf of the given UE comprises a function selected from the group consisting of (i) registering a second network address of the gateway system with the first address of the call server system and (ii) registering the first network address of the gateway system with a second network address of the call server system.

11. The method of claim 7, wherein the given UE subscribes to service of the call server system, and wherein the communication system includes a Domain Name System (DNS) server that includes correlation data correlating the service with one or both of (i) a particular gateway of the gateway system and (ii) a particular call server of the call server system, the method further comprising:

responsive to the detecting, revising the correlation data to instead correlate the service with one or both of (i) a different gateway of the gateway system and (ii) a different call server of the call server system; and using the revised correlation as a basis for re-establishing communication between the gateway system and the call server system on behalf of the given UE.

12. The method of claim 11, wherein using the revised correlation as a basis for re-establishing communication between the gateway system and the call server system on behalf of the given UE comprises one or both of (i) based on the correlation data, selecting the different gateway of the gateway system to register with the call server system on behalf of the given UE and (ii) based on the correlation data, selecting the different call server of the call server system for the gateway system to register with on behalf of the given UE.

13. The method of claim 2, wherein detecting failure of communication between the gateway system and the call server system comprises detecting absence of a threshold number of heartbeats or a threshold number of heartbeat responses.

14. The method of claim 2, wherein detecting failure of communication between the gateway system and the call server system comprises detecting that the gateway system has not received communication from the call server system for a predefined non-zero threshold period of time.

15. The method of claim 2, wherein determining that the given UE recently missed communication from the call server system comprises querying an entity of the call server system to determine that the call server system sent a particular communication destined to the given UE, and determining the UE was not paged for delivery of the particular communication.

16. The method of claim 2, wherein determining that the given UE recently missed communication from the call server system comprises querying a server to determine whether voice mail message has been left for the given UE within a past non-zero predefined threshold time period.

17. The method of claim 2, wherein determining that the given UE recently missed communication from the call server system comprises querying the call server to obtain data representing one or more missed communications.

18. A method comprising:

for each of a plurality of user equipment devices (UEs), setting up a respective bearer connection for carrying bearer data between the UE and a gateway system, wherein the gateway system is registered with the application server system on behalf of each UE and provides connectivity between each UE's bearer connection and the application server system;

detecting failure of communication between the gateway system and the application server system; and responsive to the detecting, (i) determining which of the UEs have each recently experienced threshold missed communication from the application server system, and (ii) directing each of the determined UEs to re-initiate setup of the UE's respective bearer connection.

19. The method of claim 18, wherein re-initiating setup of a UE's bearer connection triggers re-registration of the gateway system with the application server system on behalf of the UE.

20. A mobility management entity comprising:

a network communication interface;

a processing unit;

data storage; and program instructions stored in the data storage and executable by the processing unit to carry out functions comprising:

engaging in signaling through the network communication interface to set up for a user equipment device (UE) at least one bearer connection with a gateway system and to cause the gateway system to register with a call server system on behalf of the UE, wherein the gateway system provides connectivity for the UE between the bearer connection and the call server system, making a first determination that connectivity between the gateway system and the call server system has failed, responsive to making the first determination, making a second determination of whether the UE has recently missed communication from the call server, and responsive to the second determination being that the UE has recently missed communication from the call server, engaging in further signaling through the network communication interface to direct the UE to re-initiate the bearer connection, wherein re-initiation of the bearer connection results in re-registration of the gateway system with the call server system on behalf of the UE.

\* \* \* \* \*